United States Patent [19]

Synowiec et al.

[11] 4,382,734
[45] May 10, 1983

[54] CARGO SECUREMENT DEVICE

[75] Inventors: Stanislaw Synowiec, Chicago; Emil J. Hlinsky, Oak Brook, both of Ill.

[73] Assignee: MacLean-Fogg Company, Mundelein, Ill.

[21] Appl. No.: 252,829

[22] Filed: Apr. 10, 1981

[51] Int. Cl.³ ............................ B60P 1/64; B60P 7/13; B61D 45/00
[52] U.S. Cl. ........................................ 410/70; 410/80
[58] Field of Search ................... 410/32, 69, 70, 71, 410/72, 73, 74, 75, 76, 77, 78, 79, 80, 81, 84, 94, 70, 80; 244/137 R

[56] References Cited

U.S. PATENT DOCUMENTS

| | | | |
|---|---|---|---|
| 3,498,238 | 3/1970 | Sweger | 410/70 |
| 3,603,267 | 9/1971 | Schwiebert | 410/74 |
| 3,667,401 | 6/1972 | Schwiebert et al. | 410/70 |
| 3,670,663 | 6/1972 | Sweger | 410/70 |
| 3,865,047 | 2/1975 | Hlinsky et al. | 410/75 |
| 4,114,718 | 9/1978 | Lipshield | 410/77 X |

Primary Examiner—Bruce H. Stoner, Jr.
Assistant Examiner—Howard Beltran
Attorney, Agent, or Firm—Mason, Kolehmainen, Rathburn & Wyss

[57] ABSTRACT

A container pedestal for supporting and securing a cargo container having a catch opening on a vehicle such as a rail car. The pedestal includes a base defining a platform for supporting the container. A pivotal latch lever is biased by a spring into a latched position wherein a latching nose on the lever registers with a latch recess in the container. The latch nose is contacted by the container for pivoting the latch lever from the latched to a released position when the container is raised or lowered. The latch lever is mounted for vertical movement as well as pivotal movement, and interfacing locking surfaces are provided on the latch lever and on the pedestal base for preventing pivotal movement of the latch lever out of the latched position when the latch lever is in an upper position. The spring biases the latch lever upwardly to maintain the locking surfaces normally in engagement so that, when the latch lever is in its upper position, the container cannot pivot the latch lever. If a container is lowered into the pedestal with the latch lever in the upper position, the container moves the latch lever downwardly to separate the locking surfaces and permit the latch lever to pivot to the released position for automatic loading of the container. A cam is selectively operable to hold the latch lever in its lower position wherein the locking surfaces are separated and the latch lever can be pivoted by upward or downward movement of a container. A line contact between the latch lever and the spring provides a uniform spring lever arm length.

15 Claims, 14 Drawing Figures

CARGO SECUREMENT DEVICE

The present invention relates to cargo securement devices and more particularly to improvements in cargo container support pedestal hold down devices.

Subject matter disclosed in this application is claimed in a copending application Ser. No. 252,830 filed on the same day as the present application in the name of Stanislaw Synowiec.

The shipment of containerized lading on rail cars and other vehicles has become widespread. For example, intermodal containers are used for the shipment of many types of cargo by rail car, ship and truck. One advantage of containerized shipment is that a loaded container can be transferred from one carrier to another without loading and unloading the cargo from the container. While containerized shipment of general cargo has become an established practice, specialized containers for the shipment of hazardous materials have also been proposed in order to take advantage of the fact that the cargo need not be removed from the container during shipment, loading, or unloading.

Cargo securement devices, known as container pedestals, have been developed for use with intermodal containers on rail cars. In a typical system, four pedestals receive the four lower container corners and hold the container a small distance above the deck providing clearance for a crane or other lifting device used to lower and raise the container relative to the car. As illustrated, for example, in U.S. Pat. No. 3,865,047-Hlinsky et al. issued on Feb. 11, 1975, the pedestals may be adjustable on the car to receive containers of different lengths, and may be stowed in the deck in a position wherein the car deck is not obstructed.

A conventional pedestal includes a base defining a pocket-like platform for supporting the container corner and preventing longitudinal and lateral movement. A hold-down device engages a catch opening in the container to prevent upward movement of the container from the platform as might result from wind loads, jarring of the car, or the like. Manually operated hold-downs are capable of securely holding the container, but are subject to the disadvantage that they must be manually locked and released for loading and unloading of the container on the car. Another disadvantage is that the container is vertically unsecured if the hold-down is inadvertently not operated or installed.

In order to permit automatic loading and unloading of the car, self-entry and self-releasing hold-downs are widely used. Typically a pivoted, spring biased latch lever includes a latch nose extending into the container catch opening. During loading, the container bottom strikes a cam surface on the top of the nose and pivots the lever to a release position. As the container descends onto the pedestal platform, the spring returns the lever to the latched position with the nose within the latch recess.

The spring force and a cam surface on the bottom of the nose prevent upward movement of the container until a predetermined upward force is applied. During automatic unloading, the container is lifted with a larger force to pivot the latch lever to the released position and permit upward movement of the container. One example of a hold-down latch mechanism permitting automatic loading and unloading is disclosed in U.S. Pat. No. 3,667,401-Schwiebert et al. issued on June 6, 1972.

To prevent accidental release and loss of or damage to a container during shipment, it is desirable that the maximum hold-down force be as large as possible and larger than upward forces exerted on the container during transit. To permit self-release on unloading, it is desirable that the maximum force not be too large. In practice, the maximum force is a compromise of these conflicting goals and results in a maximum hold-down force that may not be adequate for extreme roadbed or wind conditions or for hazardous cargo security.

Among the objects of the present invention are to provide improvements in pedestals and hold-down latch mechanisms for pedestals; to provide a container pedestal with a latch mechanism having the advantages of both manual and automatic latch mechanisms and avoiding disadvantages of both; to provide a pedestal latch mechanism capable of fully automatic operation and capable of being manually locked in the event of extreme conditions; to provide a container latch mechanism capable of being automatically loaded even in the manually locked condition, to provide a pedestal latch mechanism remaining fully effective as a self-releasing automatic latch even if the manual lock is inadvertently not operated; to provide a pedestal latch mechanism having features adaptable to containers for hazardous materials and capable of providing large hold-down forces; and to provide improvements over container pedestals and latch mechanisms of the types used in the past.

In brief, in accordance with the above and other objects and advantages of the present invention, there is provided a container pedestal including a base defining a platform for supporting a cargo container which may be lowered onto and lifted from the pedestal. A latch lever is pivotally mounted on the base and is biased into latched position by a spring acting between the base and the lever. The lever includes a latching nose registering with a recess in the container for holding the container on the platform. The latch nose is contacted by the container for pivoting the latch lever from the latched position to a released position upon raising and lowering of the container.

In accordance with the invention, the latch lever is mounted for vertical as well as pivotal movement. Interfacing locking surfaces are provided on the latch lever and on the base and are engageable with one another when the latch lever is in an upper, locked position for preventing pivotal movement of the latch lever out of the latched position. Consequently, with the latch lever in the upper position, very large hold-down forces are possible. The spring biases the latch lever toward its upper position so that the locking surfaces are normally held in engagement with one another. Automatic loading of a container is nevertheless possible because as a container is lowered toward the pedestal, the container lowers the latch lever from its upper position to separate the locking surfaces and permit pivotal movement of the latch lever.

A cam is selectively operable for moving the latch lever to a lower position wherein the locking surfaces are separated from one another and automatic loading and unloading are permitted. After loading, the cam may be operated to its alternate position to engage the locking surfaces.

The present invention together with the above and other objects and advantages will appear from the following detailed description of the embodiments of the invention illustrated in the accompanying drawings, wherein:

Figure 1:
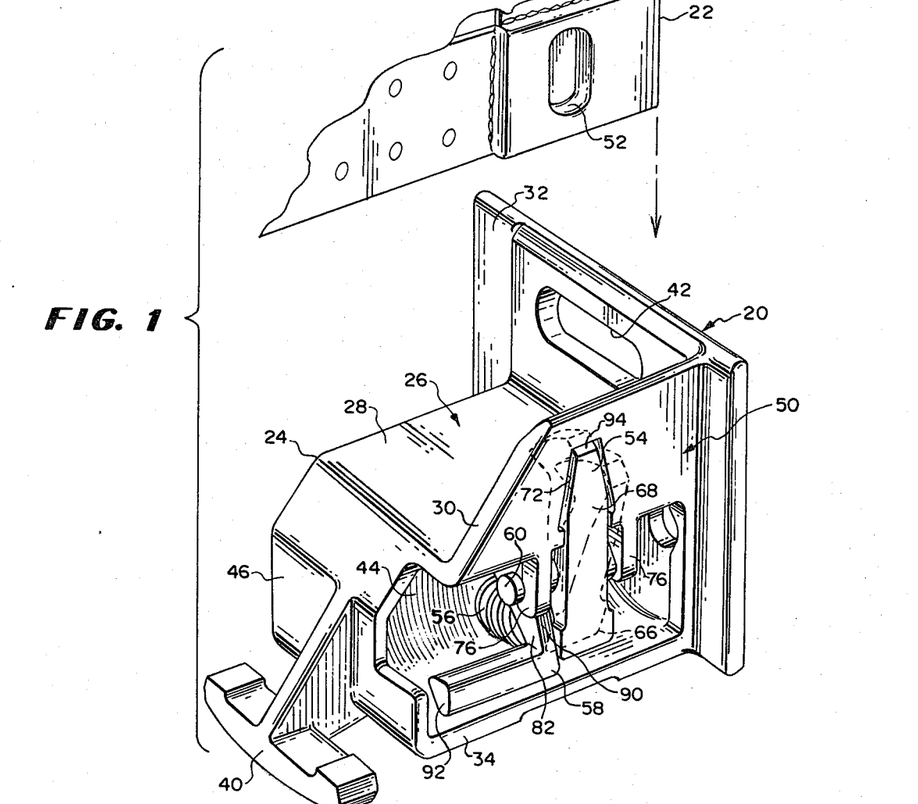
FIG. 1 is a perspective view of a container pedestal constructed in accordance with the present invention and of part of a cargo container.
Figure 2:
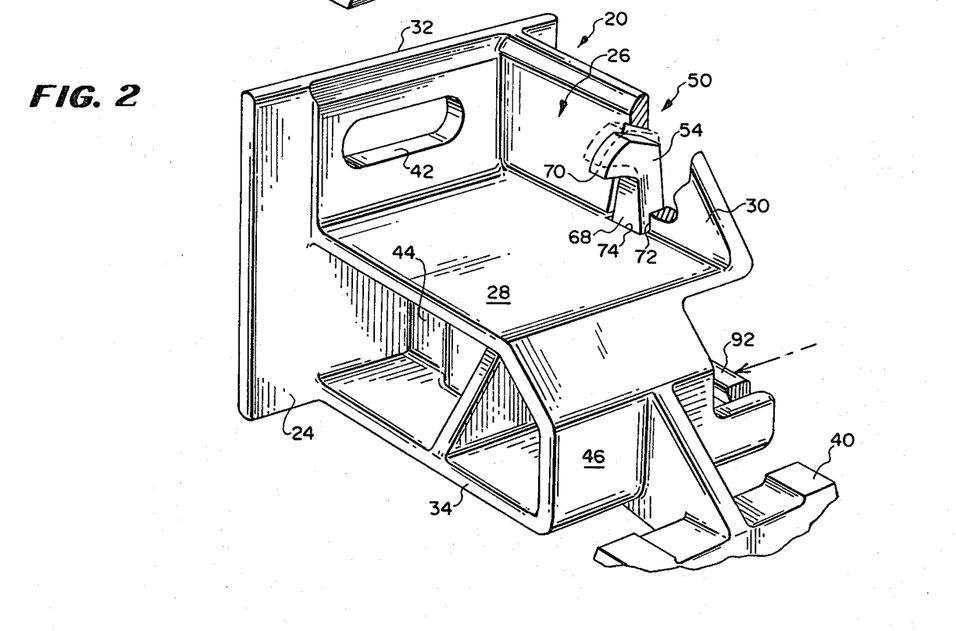
FIG. 2 is a rear perspective view of the pedestal of FIG. 1.
Figure 3:
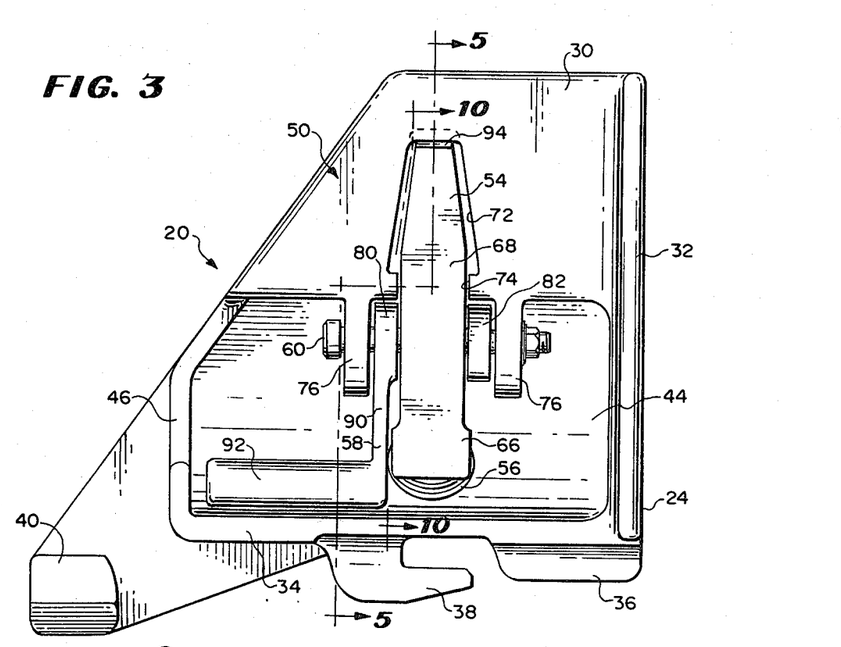
FIG. 3 is a side view of the pedestal of FIG. 1.

Having reference now to the drawings, and initially to FIGS. 1-4, there is illustrated a cargo container support pedestal designated as a whole by the reference numeral 20 constructed in accordance with the principles of the present invention. The illustrated pedestal 20 is used to support one of the four lower corners 22 of an intermodal cargo container of which a fragment is shown in FIG. 1. Four pedestals 20 may be used to support a container above the deck of a rail car in the manner more fully described in U.S. Pat. No. 3,865,047-Hlinsky et al.

In general, the pedestal 20 includes a base 24 preferably in the form of an integral, one-piece casting. The base 24 defines a pocket-like platform 26 including a base wall 28 bordered on one side by a side wall 30 and on one end by an end wall 32. A bottom wall 34 of the base 24 is adapted to rest upon the car deck (not shown). A guide fin 36, a pair of hooks 38, and a guide or tail 40 extend from the bottom wall 34 and cooperate in known manner with a guide or track structure of the rail car deck so that the pedestal 20 can be moved to different positions or stowed. A handle slot 42 is formed in end wall 32 for manipulation of the pedestal 20.

Suitable clearance, for example six inches or so, is provided between the bottom wall 34 and the base wall 28 so that a suitable lifting device can be received beneath the container 22 and above the rail car deck. The end wall 30, a central wall 44 and an additional end wall 46 extend between the base wall 28 and bottom wall 34. A container is loaded onto the rail car by lowering the container onto the pedestal until the bottom of the container rests upon base wall 28. The side and end walls 30 and 32 prevent lateral or longitudinal movement of the container 22. The container 22 is unloaded from the rail car by lifting the container upward from the pedestal 20.

A hold-down latlch assembly generally designated as 50 engages a catch opening 52 in the container corner 22 for preventing upward movement of the container and securing the container in position during movement of the rail car. The latch assembly 50 is of the automatic self-entry and self-releasing type in that the container is automatically latched and unlatched upon loading and unloading without the necessity for manual operation of the latch assembly. However, the latch assembly can be manually operated after loading to a locked condition wherein large hold-down forces are provided and self-releasing or inadvertent releasing of the latch assembly 50 is prevented. In the locked condition, automatic self-entry operation of the latch assembly 50 remains possible.

Referring in more detail to the construction and operation of the latch assembly 50, it includes a latch lever 54, a spring 56 continuously biasing the latch lever 54 into a latched positon, and a cam 58. The cam 58 is movable between a position illustrated in FIGS. 5-7 wherein the latch assembly 50 is in an unlocked condition and an alternative position illustrated in FIGS. 8 and 9 wherein the latch assembly 50 is in a locked condition.

Figure 6:
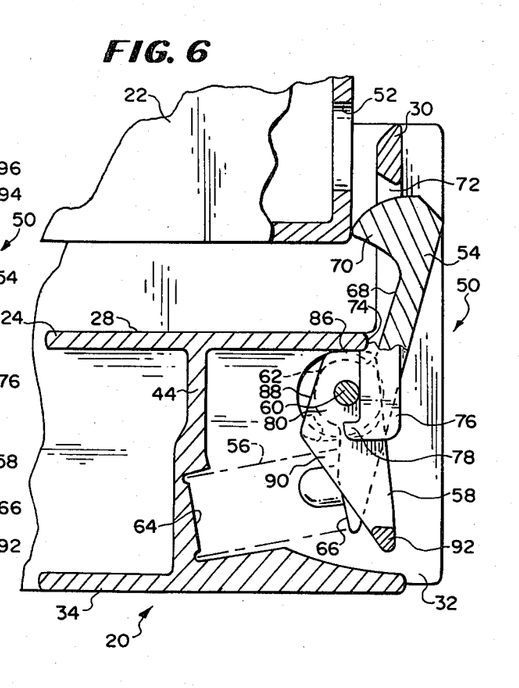
FIG. 6 is a view similar to FIG. 5 illustrating the latch mechanism at a subsequent time during loading of a container.
Figure 7:
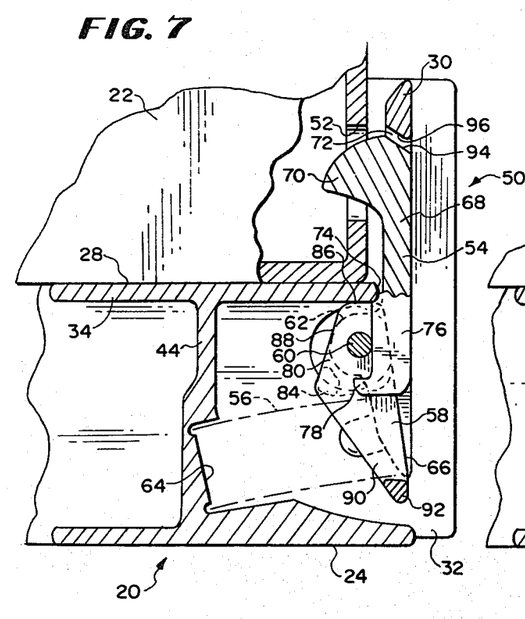
FIG. 7 is a view similar to FIG. 5 illustrating the latch mechanism with a container fully loaded.
Figure 8:
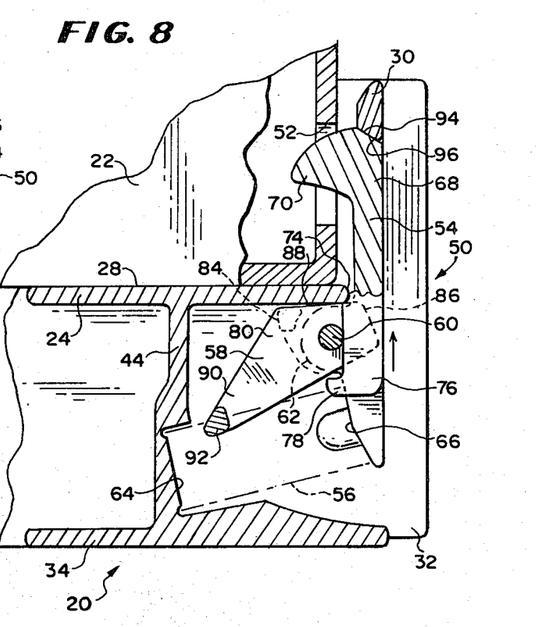
FIG. 8 is a view similar to FIG. 5 illustrating the loaded pedestal in a manually locked condition.

Latch lever 54 is pivotally mounted with respect to the base 24 by means of a pivot bolt 60 engaging a central, hub portion 62 (FIG. 4) of the lever. Spring 56 is held in compression between a spring seat 64 defined on central wall 44 and a spring engagement portion 66 of the lever 54. The opposite end of lever 54 includes a shank portion 68 and a locking nose 70 fitting within complementary-shaped recesses 72 and 74 in the end wall 30 and base wall 28. Spring 56 continuously biases the lever 54 in the counterclockwise direction as viewed in FIGS. 5-9 toward a latched position wherein, as shown in FIGS. 7 and 8, the locking nose 70 is received within the catch opening 52 of the container corner 22.

The latch lever 54 is mounted for limited vertical movement as well as pivotal movement. In the illustrated arrangement, the pivot bolt 60 is continuously urged by the spring 54 against a pair of retaining lugs 76 having projections 78 preventing movement of the pivot bolt 60 beyond the ends of the lugs 76. The lever is movable between an upper position illustrated in FIGS. 8 and 12 and a lower position illustrated in FIGS. 7 and 10 and in solid lines in FIG. 2. Spring 56 not only biases lever 54 in a pivotal direction toward the latched condition, but also continuously biases the lever as well as the pivot bolt 60 in an upward direction.

More specifically, spring 56 acts as a compression spring in biasing the lever 54 to pivot toward the latched position. This spring action appears in FIGS. 10 and 11 where it can be seen that the spring 56 is compressed as the lever 54 rotates from the latched to the released position. Spring 56 acts essentially as a cantilever or leaf spring in continuously biasing the lever 54 in the upward direction. When lever 54 is in its upper position (FIG. 12), the spring 56 is substantially straight or cylindrical. As the lever moves downwardly to the position of FIG. 10, the spring is curved or deformed or flexed in such a way that its axis is not straight and the lower portion of the spring is compressed more than the upper portion. The tendency of the spring 56 to return to a straight or cylindrical position normal to the seat 64 continuously biases the lever 54 upwardly.

Figure 4:
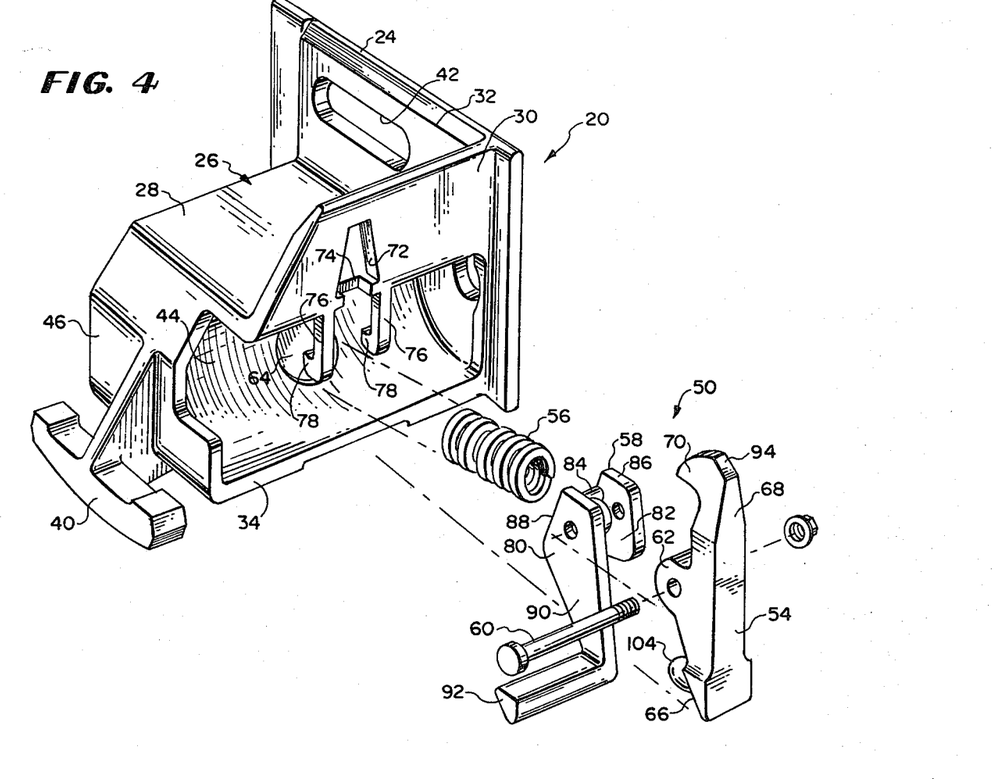
FIG. 4 is an exploded perspective view of the pedestal.

Movement of the lever between its upper and lower positions is controlled by the cam 58 in combination with the spring 56. As best illustrated in FIG. 4, cam 58 includes a pair of plates 80 and 82 sandwiched around the lever hub portion 62 joined by a spacer 84. The plates 80 and 82 define a pair of cam surfaces 86 and 88 located at different distances from the pivot axis defined by pivot bolt 60. Cam plate 80 includes an extending portion 90 carrying a laterally extending operating handle 92 by which the cam 58 can be moved between its alternate positions shown in FIGS. 7 and 8. In the region of the latch assembly 50, the central wall 44 and bottom wall 34 merge in a smoothly curved, sloping wall surface adjacent the path of travel of the handle 92 in order to prevent injury to or pinching of the hand during movement of the handle 92.

Interfacing locking surfaces 94 and 96 are defined on the latch lever 54 and the base 24. Locking surface 94 is defined at the end of the lever adjacent the latch nose 70, while the cooperating locking surface 96 is defined in the side wall 30 at the end of the recess 72. In the upper or locked position of the lever 54, the locking surfaces 94 and 96 are engaged and the lever 54 cannot pivot from the latched position in response to an upward force applied to the latch nose 70. In the lower or unlocked position of the lever 54, the locking surfaces 94 and 96 are spaced apart and the lever can pivot from the latched position of FIG. 7 to the released position illustrated in FIG. 6.

Figure 5:
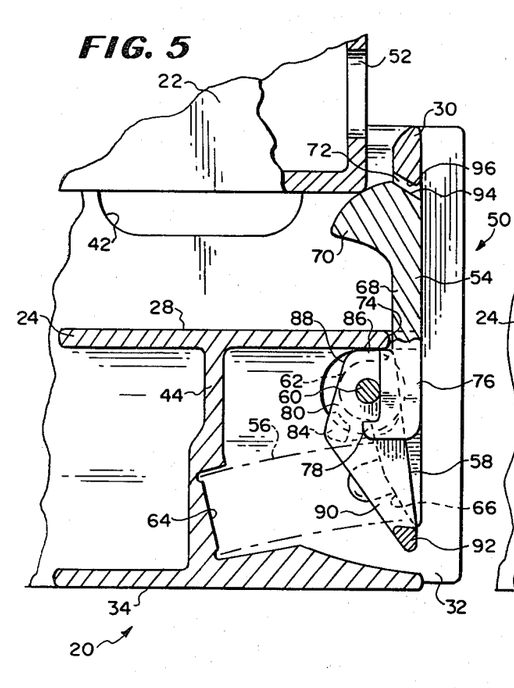
FIG. 5 is a sectional view taken along the line 5—5 of FIG. 3 illustrating the latch mechanism of the pedestal during loading of a container.

When the cam 58 is in the unlocked position illustrated for example in FIGS. 5 and 7, the cam surface 86 engages the underside of base wall 28 and the cam is held in this position by the upward component of force applied by spring 56. Consequently, in this position of cam 58, the lever is maintained in its unlocked position. When the cam 58 is moved to its alternate position shown in FIG. 8, cam surface 88 interfaces with the bottom wall 34 and permits the spring 56 to move the lever 54 upwardly to its locked position wherein the locking surfaces 94 and 96 engage one another.

Upper and lower cam surfaces are provided on the latch nose 70 to permit self-entry and self-release of the latch assembly 50. As illustrated in FIGS. 5–7, loading may be accomplished with the lever in the unlocked, lower position. The descending container corner 22 strikes the upper surface of the nose 70 causing the lever 54 to pivot against the force provided by spring 56 from the latched position illustrated in FIG. 5 to the released position illustrated in FIG. 6. As the container corner 22 continues to descend to the fully loaded position of FIG. 7, the spring 56 pivots the lever back into the latched position wherein the nose 70 is in latched engagement with the catch opening 52.

Unloading of the container 22 from the pedestal may only be effected with the lever 54 in the lower, unlocked position. During unloading, the edge of the catch opening 52 contacts the lower surface of nose 70. Due to the force provided by the spring 56, the lever 54 does not move from the latched position until a maximum hold-down force in the upward direction is achieved. When the maximum upward force is reached, the edge of the catch opening 52 in contact with the lower nose surface again pivots the lever 54 from the latched to the released position and permits continued upward unloading movement of the container 22.

Spring 56 applies a biasing force urging the lever toward the latched position. The spring force must be overcome both during loading and unloading. As the lever pivots between positions, the angular relationship between the spring engagement portion 66 of the lever and the spring seat 64 is altered. If a conventional uniplanar spring engagement surface is used, it is difficult to attain reliable and predictable spring biasing forces due to the changing angular relationships and effective lever arm length.

Figure 10:
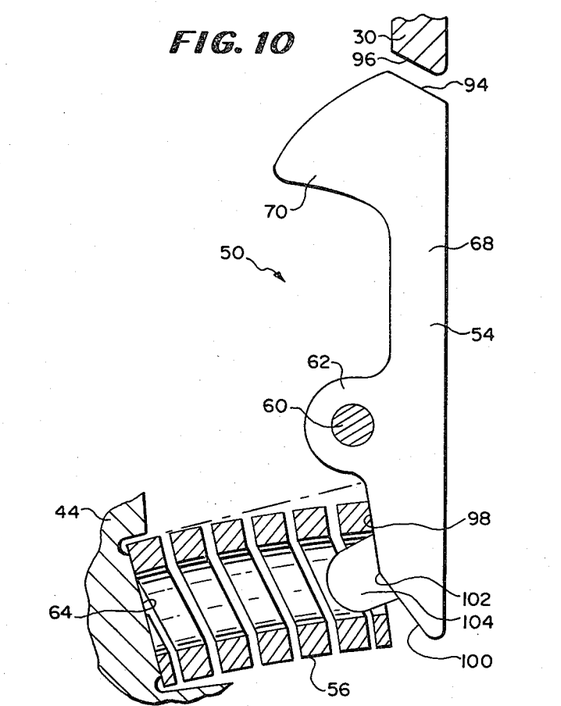
FIG. 10 is an enlarged and somewhat diagrammatic sectional view taken along the line 10—10 of FIG. 3 and illustrating the position of the latch lever and biasing spring with the latch mechanism in the automatic loading and unloading position of FIG. 5 or FIG. 7.
Figure 11:
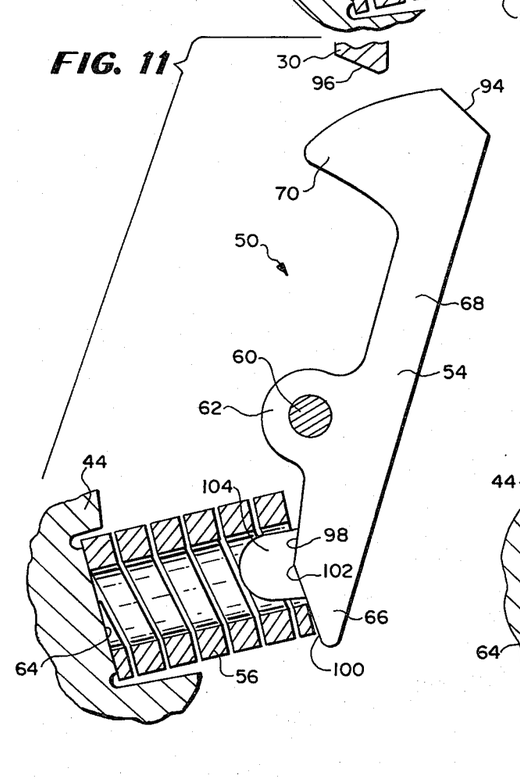
FIG. 11 is a view similar to FIG. 10 illustrating the position of the latch lever and biasing spring during loading or unloading as illustrated in FIG. 6.
Figure 12:
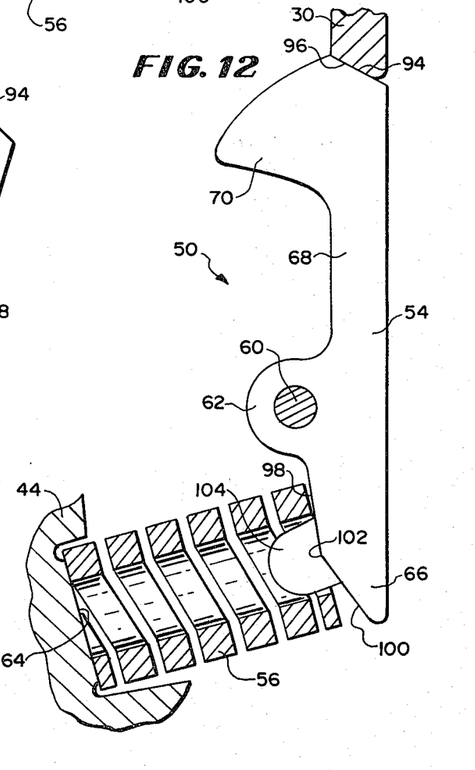
FIG. 12 is a view similar to FIG. 10 illustrating the latch lever and biasing spring in the manually locked position of FIG. 8.

With reference to FIGS. 10–12 it can be seen that the spring engagement portion 66 of lever 54 includes an abutment or spring engagment surface defined by two intersecting planes 98 and 100. Planes 98 and 100 define a line 102 forming a line of contact with the spring end. The spring 56 is formed with a flat or squared end, and line 102 maintains a consistent contact with the spring end regardless of pivoting of the lever. In the illustrated arrangement, the lever includes a spring locating projection 104 generally symmetrical about line 102, and line 102 generally bisects the spring end. The included angle defined by planes 98 and 100 is equal to or less than the supplementary angle of the angle through which lever 54 pivots—i.e., the pivot angle plus the included angle is not larger than 180°. Thus line contact between the lever and spring is always maintained, and consistent, predictable latch operating torques are achieved because the lever arm length (the distance between the lever pivot point and the point of spring force application) remains constant.

The maximum hold-down force applied by the latch assembly 50 to a loaded container is normally sufficient to retain the container in position on pedestal 20 during transport of the container on the rail car. However, under extreme conditions, for example in a high wind or the like, it may be possible for the upward forces exerted on the container 22 to exceed the maximum hold-down force and cause inadvertent release of the latch assembly 50. The resultant loss of or damage to the container 22 can be prevented with the latch assembly 50 by moving the lever 54 from the unlocked to the upper locked condition after loading of the container 22. This is accomplished by moving the cam 58 to the position illustrated in FIG. 8 wherein the locking surfaces 94 and 96 are held in abutting relation by the spring 56. In this position, upward forces applied to the lower cam surface are unable to cause pivotal movement of the lever 54 from the latched position. The cam 58 can be moved to this manually locked position at any time after loading of a container 22, for example when extreme conditions are anticipated or experienced. Once moved to the locked condition, the container 22 cannot be unloaded with a self-release action until the cam 58 is returned to the unlocked position of FIG. 7.

Figure 9:
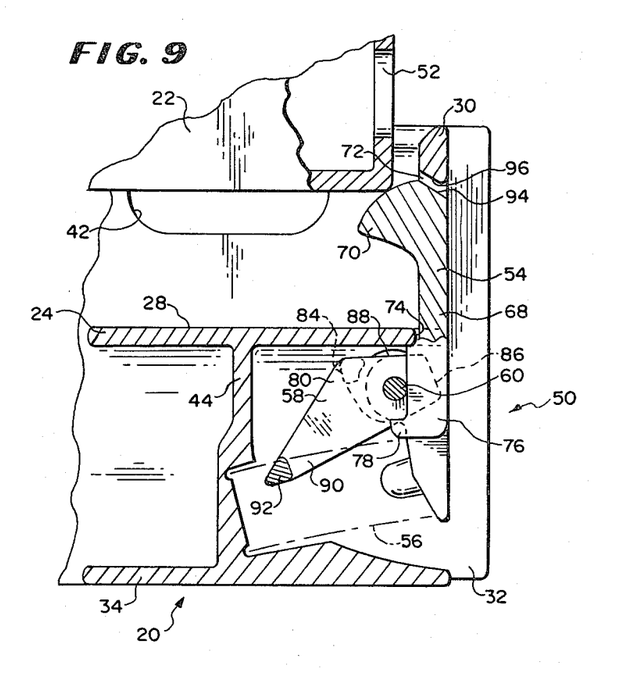
FIG. 9 is a view similar to FIG. 5 illustrating loading of a container with the latch mechanism in a manually locked condition.

As illustrated in FIG. 9, automatic self-entry operation of the latch mechanism 50 is possible when the latch assembly is in the locked condition. Thus, in the use of the pedestal 20, it is possible to place the latch mechanism in the locked condition prior to loading of a container 22, and the latch mechanism will remain in the locked condition following loading of the container. The spring force applied by the spring 56 to the lever 54 urging the lever in the upward direction is smaller than the force opposing pivotal movement of the lever from the released condition. Thus, as shown in FIG. 9, as a descending container contacts the upper surface of nose 70, the lever 54 moves downwardly, separating the locking surfaces 94 and 96. After the surfaces are separated, the lever 54 can then pivot from the latched to the released position to permit loading of the container. When the container is loaded, the spring 56 returns the latch lever 54 in the pivotal direction to the latched position and also returns the lever upwardly to the locked position illustrated in FIG. 8.

Figure 13:
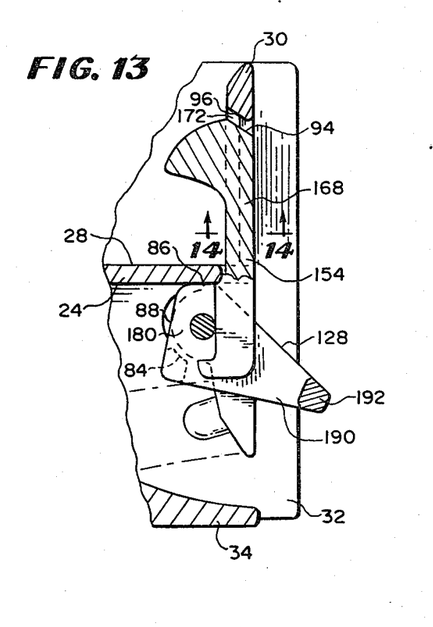
FIG. 13 is a view similar to a portion of FIG. 5 and illustrating an alternative embodiment of the invention.
Figure 14:
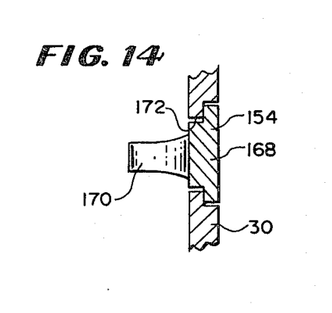
FIG. 14 is a sectional view taken along the line 14—14 of FIG. 13.

In the embodiment of the invention illustrated in FIGS. 1–9, the handle 92 and extension portion 90 of the cam remain within the profile of the pedestal base 24 in both the locked and unlocked positions. This permits the pedestal 20 to be stowed in the car deck in either the locked or unlocked condition. In FIGS. 13 and 14 there is illustrated an alternative arrangement having particular utility for hold-down latch mechanisms for hazardous material containers. In this arrangement, as shown in FIG. 13, there is provided a cam 128 having a plate 180 including an extending portion 190 and an operating handle 192. The cam 128 is illustrated in the unlocked position, and in this position the handle 192 extends to a prominent, easily observed location in which it projects outwardly from the pedestal base. An advantage of this arrangement is that the unlocked condition of the latch mechanism is easily apparent to prevent inadvertent failure to manually latch a container in which hazardous material is contained.

With reference to FIG. 14, it can be seen that the structure of the shank 168 of latch lever 154 and the corresponding structure of the recess 172 include an overlapped or stepped portion. The purpose of this configuration is to provide an even more secure retention which may be desirable with containers for hazardous materials. An upward force applied to the latch nose 170 might tend to cause the shank 168 to bow or bend in such a way that the locking surfaces 94 and 96 could become separated or that the latch nose 170 could pivot upwardly to release the container. Any tendency of the shank 168 to bow in this direction is positively prevented by the portion of the shank which overlies the stepped portion of the recess 172.

While the invention has been described with reference to details of the illustrated embodiment, such details are not intended to limit the scope of the present invention as defined in the following claims:

I claim:

1. A container pedestal for a cargo container which is lowered onto and lifted from the pedestal, the container having a latch recess, said container pedestal comprising: a base defining a container receiving support, a latch lever, means mounting the latch lever for both pivotal movement and vertical movement with respect to said base, a nose portion on said lever engageable by the container upon lifting and lowering of the container to effect pivoting of the lever from a latched to a released position, said nose portion being received into the container latch recess in the latched position of said lever, locking means defined on said lever and said base inter-engaging the lever and the base for preventing pivotal movement of said lever when said lever is in an upper position, spring means for urging said lever toward the latched position in the pivotal direction and toward the upper position in the vertical direction, and cam means selectively operable to hold said lever in a lower position.

2. The container pedestal of claim 1, said locking means comprising interfacing lock surfaces on said lever and base which overlap one another in the upper lever position.

3. The containere pedestal of claim 1, said spring means comprising a single spring interposed between said lever and said base.

4. The container pedestal of claim 1 wherein said spring means applies a first biasing force urging said lever in the vertical direction and a larger biasing force urging said lever in the pivotal direction.

5. The container pedestal of claim 1 wherein said latch lever mounting means inlcudes a pivot element engaged by said lever, and means supporting said pivot element for vertical movement relative to said base.

6. The container pedestal of claim 5, said cam means being engageable with said pivot element for holding said pivot element in a lower position and engageable with said pivot element for permitting said spring means to move said lever and pivot element to an upper position.

7. The container pedestal of claim 6, said cam means including a handle for moving said cam means.

8. A container pedestal for the releaseable securement of a cargo container having a catch opening, said pedestal comprising a base defining a container receiving platform, a latch lever, pivotal mounting means supporting the latch lever for pivotal movement between latched and released positions, said latch lever having a nose portion receivable into the container catch opening for securing the container on said platform, said nose portion being engageable by the container upon raising and lowering of the container for pivoting the latch lever to the released position, spring means biasing said latch lever toward the latched position, cooperating locking structures on said latch lever and on said base inter-engageable with one another to prevent pivotal movement of said latch lever from the latched position; and cam means for moving said latch lever relative to said base for selectively engaging and disengaging said locking structures.

9. In a container pedestal of the type including a base defining a platform for supporting a cargo container lowered onto the platform and including a pivotal latch lever biased into a latched position by a spring acting between the base and the lever, the lever including a latching nose registering with a latch recess in the container for holding the container on the platform, the latch nose being contacted by the container for pivoting the latch lever from the latched to a released position, the improvement comprising:

means mounting the latch lever for vertical as well as pivotal movement;

overlapping locking surfaces on the latch lever and on the base and inter-engageable with one another for preventing pivotal movement of the latch lever out of the latched position when the latch lever is in an upper position;

the spring biasing the latch lever upwardly normally to maintain the locking surfaces in engagement so that upward movement of a container cannot pivot said latch lever;

the vertical biasing force applied by the spring being smaller than the downward force component applied to the latch lever by a lowered container so that the latch lever moves downward to separate said locking surfaces and then pivots to the released position in response to lowering of a container; and a cam selectively operable for moving the latch lever to a lower position wherein said locking surfaces are separated and said latching lever can be pivoted by vertical movement of a container.

10. The improvement claimed in claim 9 further comprising an operating handle for said cam, said handle being movable to a first position wherein said lever is moved to its lower position and to a second position wherein said lever is moved to its upper position.

11. The improvement claimed in claim 10 wherein said handle is beneath said platform in both said positions.

12. The improvement claimed in claim 10 wherein said handle projects from said base in said second position.

13. A container pedestal for the releaseable securement of a cargo container having a catch opening, said pedestal comprising a base defining a container receiving platform, a latch member, mounting means supporting the latch member for movement in a first direction between latched and released positions, said latch member having a nose portion receivable into the container catch opening for securing the container on said platform, said nose portion being engageable by the container upon raising and lowering of the container for moving the latch member in said first direction to the released position, spring means biasing said latch member toward the latched position, cooperating locking structures on said latch member and on said base inter-engageable with one another to prevent movement of said latch member in said first direction from the latched position; and cam means for moving said latch member relative to said base in a second direction for selectively engaging and disengaging said locking structures to cause interlocking and release of the locking structures.

14. The container pedestal of claim 13, said nose portion and said spring means being constructed and arranged to move said latch member in said second direction for disengaging said locking structures in response to lowering of a container while said locking structures are in engagement.

15. A container pedestal for the releaseable securement of a cargo container having a catch opening, said pedestal comprising:
a base defining a container corner receiving platform;
a latch assembly for holding the container corner on said platform;
said latch assembly including a spring biased nose receivable in the catch opening and movable out of the path of the container corner when lowered onto and raised from said platform;
manually operated locking means movable to a locked position for locking said nose against movement out of the container corner path; and
means for unlocking said nose in response to engagement of said nose by a container being lowered; and
means for maintaining said manually operated locking means in a locked position during nose unlocking whereby said nose is returned to the locked position after lowering of said container.

* * * * *